C. J. WOOLSON.
Carriage-Spring.
No. 5,281.
Patented Sept. 11, 1847.
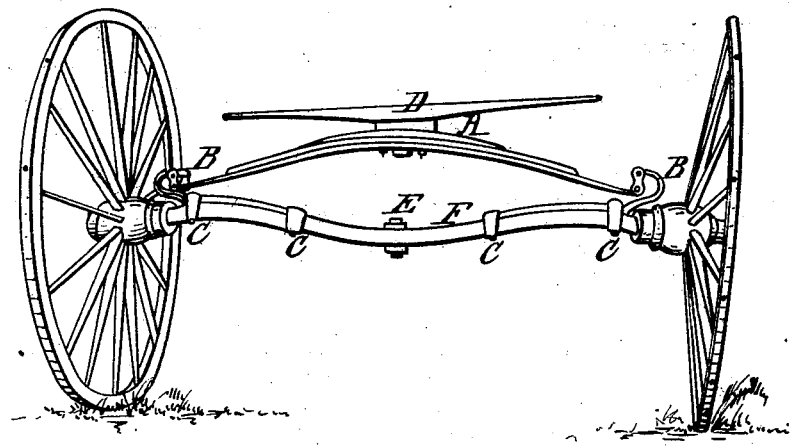

UNITED STATES PATENT OFFICE.

CHS. J. WOOLSON, OF CLEVELAND, OHIO.

HANGING CARRIAGE-BODIES.

Specification of Letters Patent No. 5,281, dated September 11, 1847.

*To all whom it may concern:*

Be it known that I, CHARLES J. WOOLSON, of Cleveland, State of Ohio, have invented a new and Improved Mode of Hanging and Constructing Four-Wheeled Carriages and Wagons; and I hereby declare that the following is a true and exact description thereof.

The nature of my invention consists in placing the bearing of the carriage body and its contents, upon the axles, very near the wheels, in a simple and improved manner.

In order to enable others to make and use my invention, I proceed to describe its construction and operation.

The form of the spring which I use, is similar to the "cradle spring" so-called, or the half of an elliptic, and is marked A, in the drawing which accompanies this description. This spring is suspended or fastened at each end, near the wheels, by "swan's necks and shackles," or other convenient means of securing the same, as is seen in the drawing, marker B.

When swan's necks and shackles are used, to hold and secure the spring, they are placed upon the top of the axle, near the wheels, and are confined in their places by the two bands, (marked C, in the drawing) which are ordinarily used upon carriage axles, in similar mode and position, to confine the iron and wood together. Upon the forward axle, one of these bands sometimes forms part of the drawing apparatus to the carriage. Upon the forward axle, the spring, elevated and suspended, or otherwise fastened, as described, forms the "rocker" and turns with the axle, thereby dispensing entirely with the rocker, as usually constructed.

The object to be accomplished by the application of this invention, is lightness and strength and cheapness in construction. This mode of placing the whole weight of the carriage body and its contents near the wheels, avoiding the necessity of expending so much material and labor in the construction of the forward axle, rocker, &c., as has been customary by the usual mode of construction. The fifth wheel D is attached to the top of this spring and thus forms the connection with the carriage body, the perch E being jointed to the axle F.

What I claim as my invention, and wish to secure by Lettres Patent, is—

Connecting the "cradle spring" so called, or the single steel spring, similar in form to the half of an elliptic, to the forward axle of four wheeled carriages or wagons, at points near the hub, so as to have the spring form the rocker, and turn with the axle, and transfer the weight from the middle to the ends of the axles, as described, when this is combined with the body of the carriage by means of the fifth wheel attached to the springs, as described.

C. J. WOOLSON.

Witnesses:
L. PRENTISS,
H. G. HITCHCOCK.